(12) United States Patent
Mabee et al.

(10) Patent No.: US 11,054,296 B2
(45) Date of Patent: Jul. 6, 2021

(54) LEVEL SENSOR KIT FOR USE WITH A LIQUID STORAGE TANK, SYSTEM INCORPORATING SAME, AND METHODS OF USING SAME

(71) Applicant: MABEE ENGINEERED SOLUTIONS, INC., Shelby Township, MI (US)

(72) Inventors: Brian D. Mabee, Shelby Township, MI (US); Austin M. Mabee, Shelby Township, MI (US)

(73) Assignee: Mabee Engineered Solutions, Inc., Shelby Township, MI (US)

( * ) Notice: Subject to any disclaimer, the term of this patent is extended or adjusted under 35 U.S.C. 154(b) by 648 days.

(21) Appl. No.: 15/847,352

(22) Filed: Dec. 19, 2017

(65) Prior Publication Data

US 2019/0186977 A1 Jun. 20, 2019

(51) Int. Cl.
| | |
|---|---|
| *G01F 23/22* | (2006.01) |
| *G08B 21/18* | (2006.01) |
| *G06Q 10/08* | (2012.01) |
| *G01F 23/24* | (2006.01) |

(52) U.S. Cl.
CPC ............ *G01F 23/22* (2013.01); *G01F 23/247* (2013.01); *G01F 23/248* (2013.01); *G06Q 10/087* (2013.01); *G08B 21/182* (2013.01)

(58) Field of Classification Search
CPC ..................................................... G01F 23/22
See application file for complete search history.

(56) References Cited

U.S. PATENT DOCUMENTS

| | | | |
|---|---|---|---|
| 6,336,362 B1 | 1/2002 | Duenas | |
| 6,925,872 B2 | 8/2005 | Hadala | |
| 2001/0032506 A1* | 10/2001 | Keller | ...................... G01F 23/38 73/313 |
| 2005/0193839 A1* | 9/2005 | Gronvall | .............. G01D 11/245 73/866.5 |

(Continued)

OTHER PUBLICATIONS

Removable Accu-Level Propane Tank Gauge with Magnetic back, https://www.walmart.com/ip/Removable-Accu-Level-Propane-Tank-Gauge-with-Magnetic-back/119088994, retrieved on Dec. 12, 2017.

*Primary Examiner* — Florian M Zeender
*Assistant Examiner* — Whitney Poffenbarger
(74) *Attorney, Agent, or Firm* — Carrier Blackman & Associates, P.C.; William D. Blackman; Joseph P. Carrier

(57) ABSTRACT

A kit for connecting to, and monitoring fill levels of a fluid storage tank includes a control module and primary and secondary sensor units. The control module is electronically connected to the primary sensor unit. The control module includes a circuit board with a microprocessor, memory unit, and transmitter. Each sensor unit includes a housing a seal attached to the housing around an opening thereof, attachment structure for attaching the housing to a wall of the tank, and an infrared sensor disposed in the housing proximate the opening. The primary sensor unit also includes a circuit board disposed within the housing, an ambient temperature sensor disposed in the housing, and a communications link for communicating with the control module. A method of monitoring a fluid level in a storage tank, and a system for monitoring and reporting fluid levels in a plurality of storage tanks, are also described.

13 Claims, 13 Drawing Sheets

(56) References Cited

U.S. PATENT DOCUMENTS

| | | | |
|---|---|---|---|
| 2008/0236275 A1* | 10/2008 | Breed | B60C 11/24 73/290 V |
| 2015/0323369 A1* | 11/2015 | Marquardt | G01F 23/0007 73/290 R |
| 2018/0111145 A1* | 4/2018 | Ophardt | A47K 5/1204 |
| 2019/0083298 A1* | 3/2019 | Starkweather | A61F 7/0053 |

* cited by examiner

LEVEL SENSOR KIT FOR USE WITH A LIQUID STORAGE TANK, SYSTEM INCORPORATING SAME, AND METHODS OF USING SAME

BACKGROUND OF THE INVENTION

1. Field of the Invention

The present invention relates to a level sensor kit for use with a liquid storage tank, to a fluid level monitoring system incorporating the sensor kit, and to methods of using the kit and the system. More particularly, the present invention relates to a level sensor kit including a plurality of sensor units including both ambient and infrared temperature sensors, and a control module for communicating between the sensor units and an external communications device, as well as related systems and methods. Optionally, the storage tank may be a fuel storage tank.

2. Description of the Background Art

A number of different items are known for monitoring fluid levels in fluid storage tanks. For example, a commercial product called Accu-level propane tank gauge, sold by Hammerhead products of Santa Monica Calif. is a magnetic strip sensor which senses small temperature differentials, reflects the different temperatures as different colors and visually indicates a fill level of a propane tank. This product is commercially available.

Other examples of some of the known systems and devices for measuring a fluid level of a container include those described in Duenas, U.S. Pat. No. 6,336,362 and Hadala, U.S. Pat. No. 6,925,872.

Although the known devices have some utility for their intended purposes, a need still exists in the art for a kit, system and method for monitoring and reporting on fluid levels in fluid storage tanks. In particular, there is a need for an improved of the type described which can be retrofitted on existing tanks, with minimal or no modification of, or intrusion into such tanks.

SUMMARY OF THE INVENTION

Accordingly, it is an object of the present invention to provide a kit, system and method for monitoring and reporting on fluid levels in fluid storage tanks.

A first aspect of the present invention relates to a kit for connecting to an existing fluid storage tank, such as a tank for storing liquid propane or liquefied natural gas (LNG), to monitor a fluid level in the tank. The invention according to the first aspect includes a control module, and a plurality of fluid level sensor units. The sensor units may all be primary sensor units, or alternatively, may include a primary sensor unit and a plurality of secondary sensor units. Optionally but not necessarily, the control module may be incorporated within one primary sensor unit.

The control module may be electronically connected to the primary sensor unit, or alternatively, may be electronically connected to a plurality of sensor units. Where the control module communicates directly only with the primary sensor unit, a secondary communications link, which may include wiring, is provided between the primary and secondary sensor units.

The control module includes a circuit board having a microprocessor and a memory unit thereon, and a transmitter for communicating with an external communications device, such as a cell phone or an internet connection. The control module's microprocessor includes a timer, a wake-up circuit, and a program for reading all of the sensor units and recording such sensor readings along with the time and date of each reading.

The primary sensor unit includes a weather-resistant housing having an opening formed therein and having a hollow space formed therein in communication with the opening. A weather-resistant seal is attached to the housing of primary sensor unit surrounding the opening.

The primary sensor unit also includes attachment structure for attaching the housing to a wall of the tank. Such attachment structure may include one or more magnets if the kit is intended for use with a ferrous tank, to which a magnet will stick. Alternatively, the attachment structure may include an adhesive pad.

The primary sensor unit also includes a circuit board disposed within the housing, which may have a microprocessor thereon.

The primary sensor unit also includes an infrared sensor disposed in the housing proximate the opening for reading a localized temperature of the tank wall next to the opening.

The primary sensor unit further includes an ambient temperature sensor disposed in the housing, and a communications link in the housing for communicating with the control module.

Where secondary sensor units are used as part of the kit and system hereof, each of the secondary sensor units has some features in common with the primary sensor unit, including a weather-resistant housing having an opening formed therein and having a hollow space formed therein in communication with the opening, a weather-resistant seal attached to the housing and surrounding the opening, attachment structure for attaching the housing to a wall of the tank, an infrared sensor disposed in the housing proximate the opening; and a communications link in the housing for communicating with the primary sensor unit or with the control module.

The present invention also relates to a system for monitoring, and reporting on fluid levels in a plurality of tanks, using the equipment described herein, and to methods of monitoring fluid level(s) in one or more fluid storage tanks, using the kit and system hereof.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

It should be understood that only structures and methodology needed for illustrating selected embodiments of the present invention are described herein. Other conventional structures, and those of ancillary and auxiliary components of the system, will be known and understood by those skilled in the art.

First Embodiment—All Sensor Units Communicate with Base Station

Figure 1:
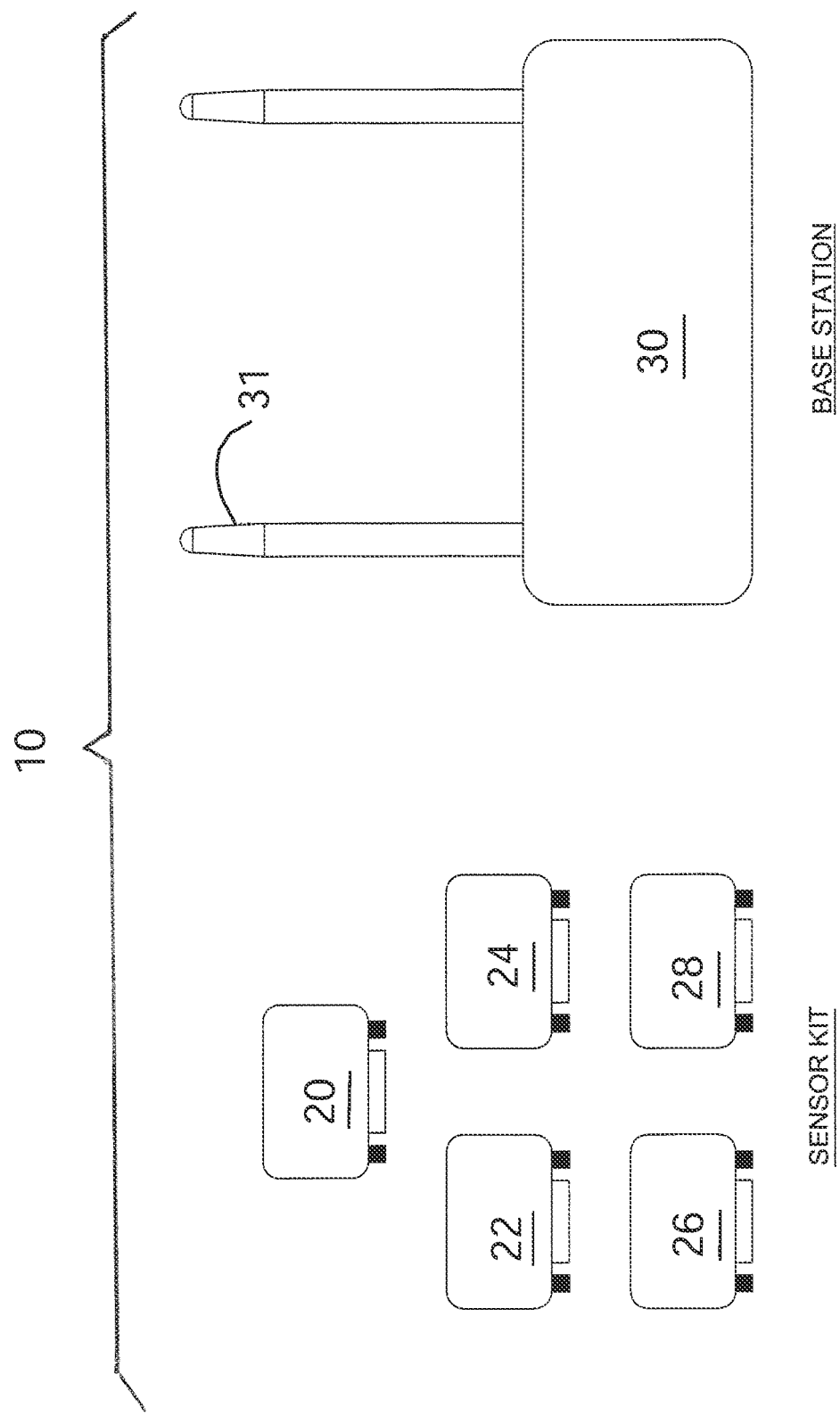
FIG. 1 is a simplified schematic diagram of a fluid level monitoring kit according to a first embodiment of the present invention.

Referring now to FIG. 1, a simplified schematic of a kit according to a first embodiment of the invention is shown generally at 10. The kit 10 is provided for use in retrofitting an existing fluid storage tank, such as that shown at 100 in FIGS. 2A-2B, to monitor and report on a fluid level in the tank 100. The tank 100 may be an existing fluid storage tank, such as a tank used for storing liquid propane, liquefied natural gas (LNG), or other liquid stored in a fluid storage tank, to monitor a fluid level in the tank. Optionally, the kit hereof may be adapted to be installed on, and used with an underground gasoline storage tank.

The kit 10 according to the present invention can be retrofitted on existing tanks, with minimal or no modification of, or intrusion into such tanks.

As further described herein, multiple kits 10 may be used to monitor fluid levels in a plurality of individual tanks, and may be electronically coordinated to form a monitoring system according to the invention.

The kit 10 includes a plurality of sensor units, such as those shown at 20, 22, 24, 26 and 28, as well as a control module or base station 30.

In this first embodiment, all of the sensor units 20, 22, 24, 26 and 28 are primary sensor units as subsequently defined herein, and each one of the sensor units independently communicates with the base station 30. Optionally but not necessarily, the base station or control module 30 may be incorporated within one of the primary sensor units 20.

Figure 3:
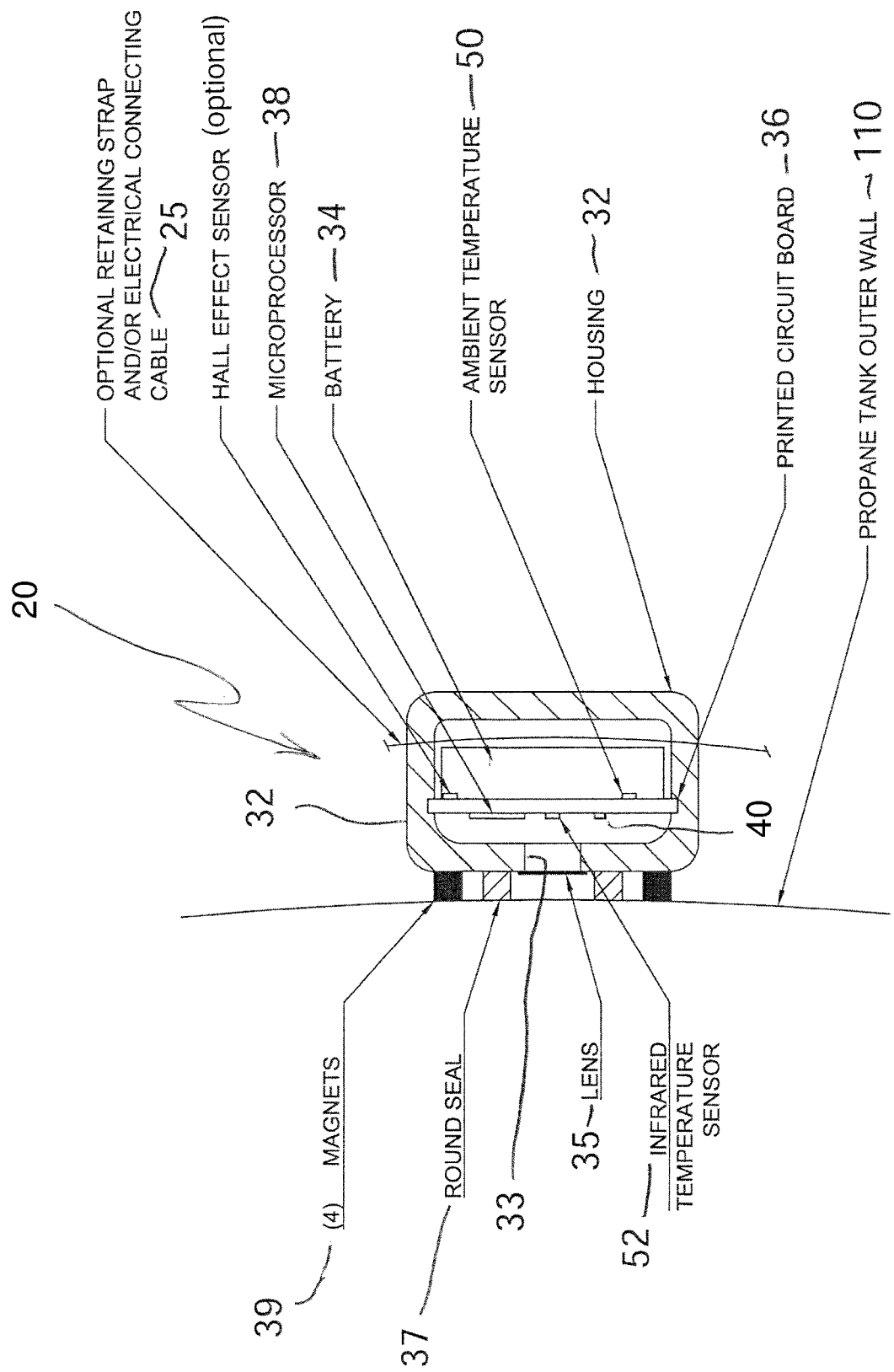
FIG. 3 is a detailed cross-sectional view of a primary sensor unit shown mounted on a tank wall.
Figure 4:
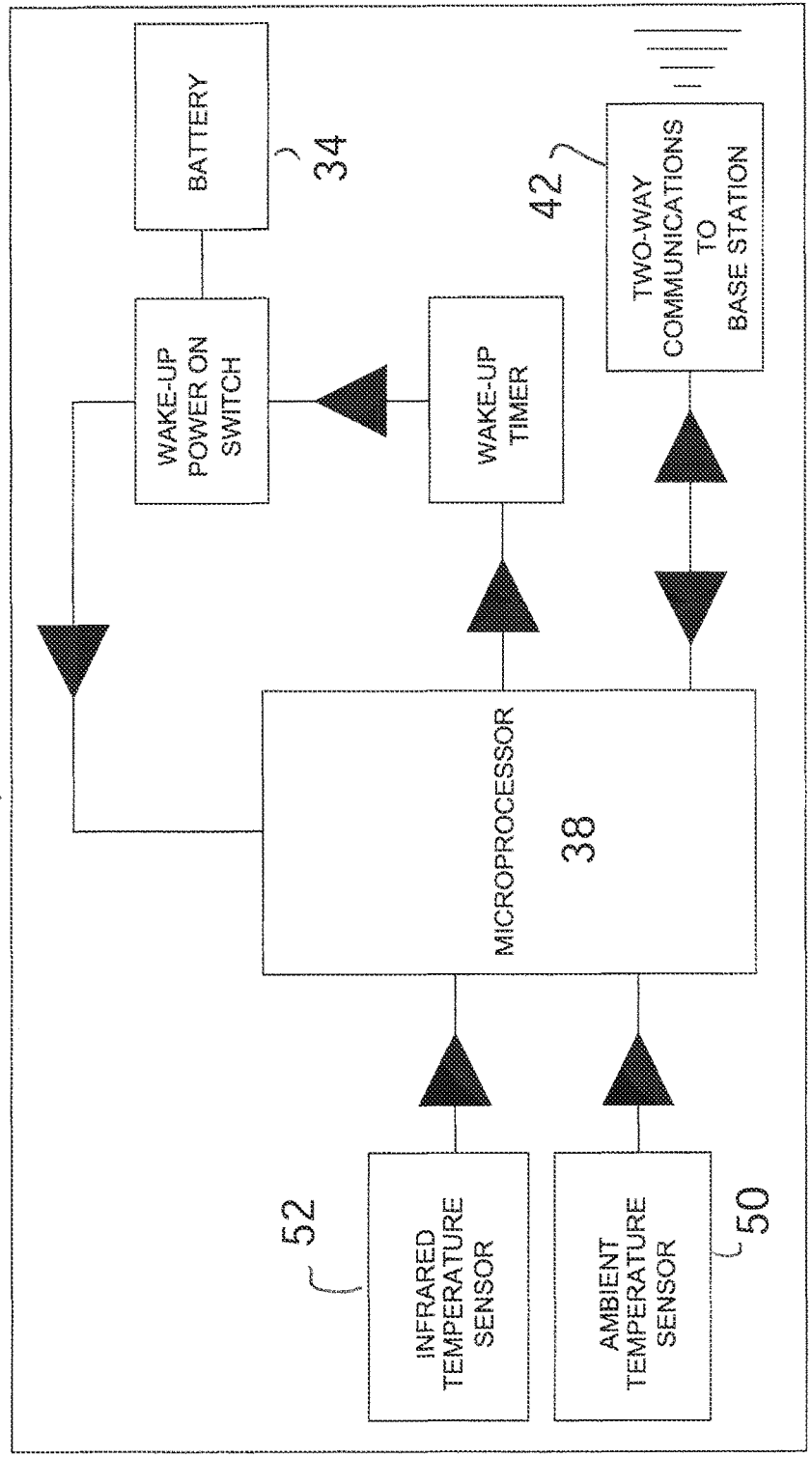
FIG. 4 is a schematic diagram of the primary sensor unit of FIG. 3.

Detailed structure of the primary sensor unit 20 is shown in FIGS. 3 and 4, and the sensor unit 20 includes the following components, some of which are optional and may be omitted.

A housing 32 made of a ferrous or non-ferrous metal or other composite material produced using injection molding, extruding, casting, additive manufacturing, 3D printing, or milling/turning/drilling. The housing 32 has an opening 33 formed therein, which may, optionally, be provided with a transparent lens. The housing 32 is also provided with a weather-resistant seal 37 surrounding the opening 33. Mounting structure 39 is also provided on the housing 32, and this mounting structure 39 may include one or more magnets, if the kit is intended for use with a ferrous tank, to which a magnet will stick. Alternatively, the mounting structure 39 may be a weather-resistant adhesive material.

A power source, typically either a battery 34 or batteries. Alternatively, the sensor unit 20 may be powered from a conventional 110 volt electrical outlet.

One or more electrical printed circuit boards 36, onto which one or more of the following components may be located (components may be singular or multiples of each). The circuit board 36 includes a switch for starting and stopping the timer in response to information from the base station 30. The switch may be a step programmed into the microprocessor 38.

Control unit including one or more programmable microprocessor(s) 38. The microprocessor 38 of the sensor unit 20 is designed to remain off whenever the tool is not in use to extend the useful life of the battery, allowing the apparatus to use a relatively small battery 34.

Memory storage module 40, which may include one or more of RAM, EPROM, and/or Solid State Flash memory.

Communication device(s) 42 provided for communicating with the base station 30. This communication device may include one or more of the following Bluetooth, Wi-Fi, Radio Frequency (RF), Infrared sending and/or receiving unit, ANT+ Device. Cellular or cellular data, USB, serial, parallel, FireWire© or another wired interface.

Alternatively, the communication device(s) 42 may be configured to communicate directly to the internet via one or more of the following: Bluetooth, Wi-Fi, Ethernet, Cellular or cellular data, Satellite, Radio Frequency (RF), Infrared sending and/or receiving unit, ANT+ Device, USB, serial, parallel, FireWire© or another wired interface.

Ambient temperature sensor 50 for sensing the general temperature in the area.

Infrared temperature sensor 52 near the opening of the housing, for sensing a localized temperature of the tank's outer wall 110 in the immediate area of the sensor unit 20. The outer wall temperature will be slightly cooler than the ambient temperature if the area inside of the tank, next to the sensor unit 20, has fluid in contact with the wall.

Figure 2A:
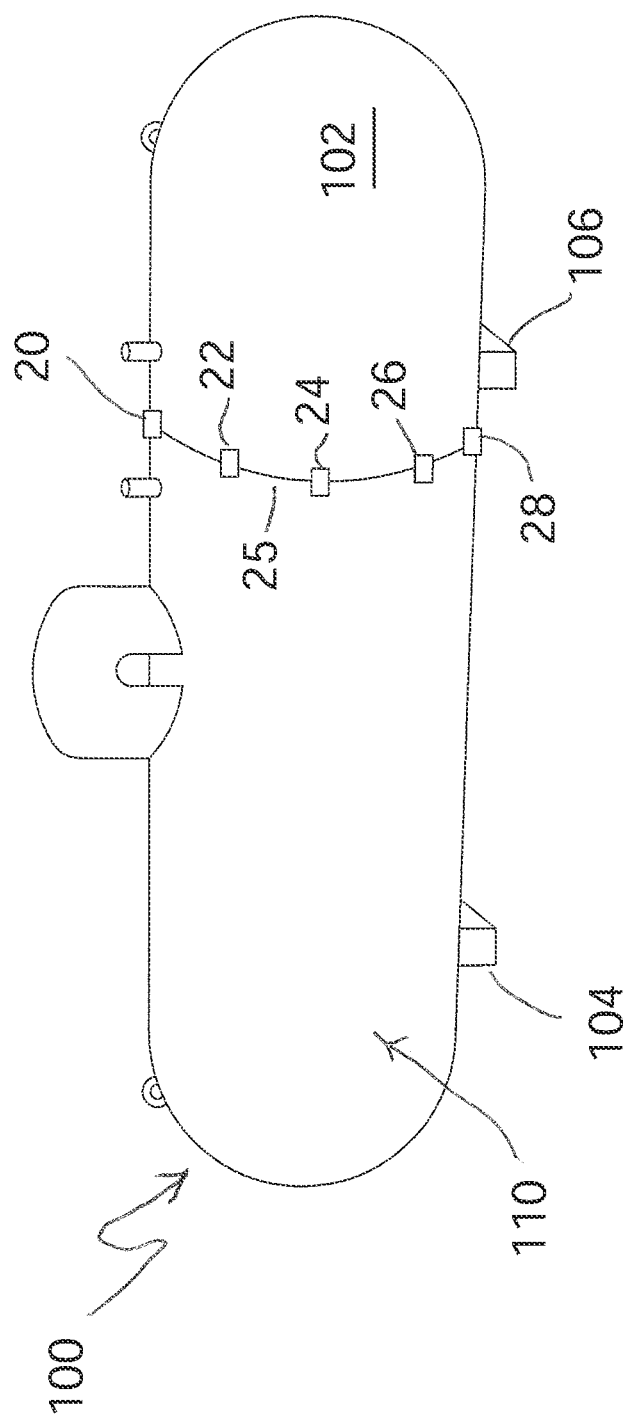
FIG. 2A is a perspective view of a propane fuel storage tank having a plurality of fluid level sensor units mounted thereon in accordance with the first embodiment of the present invention.
Figure 2B:
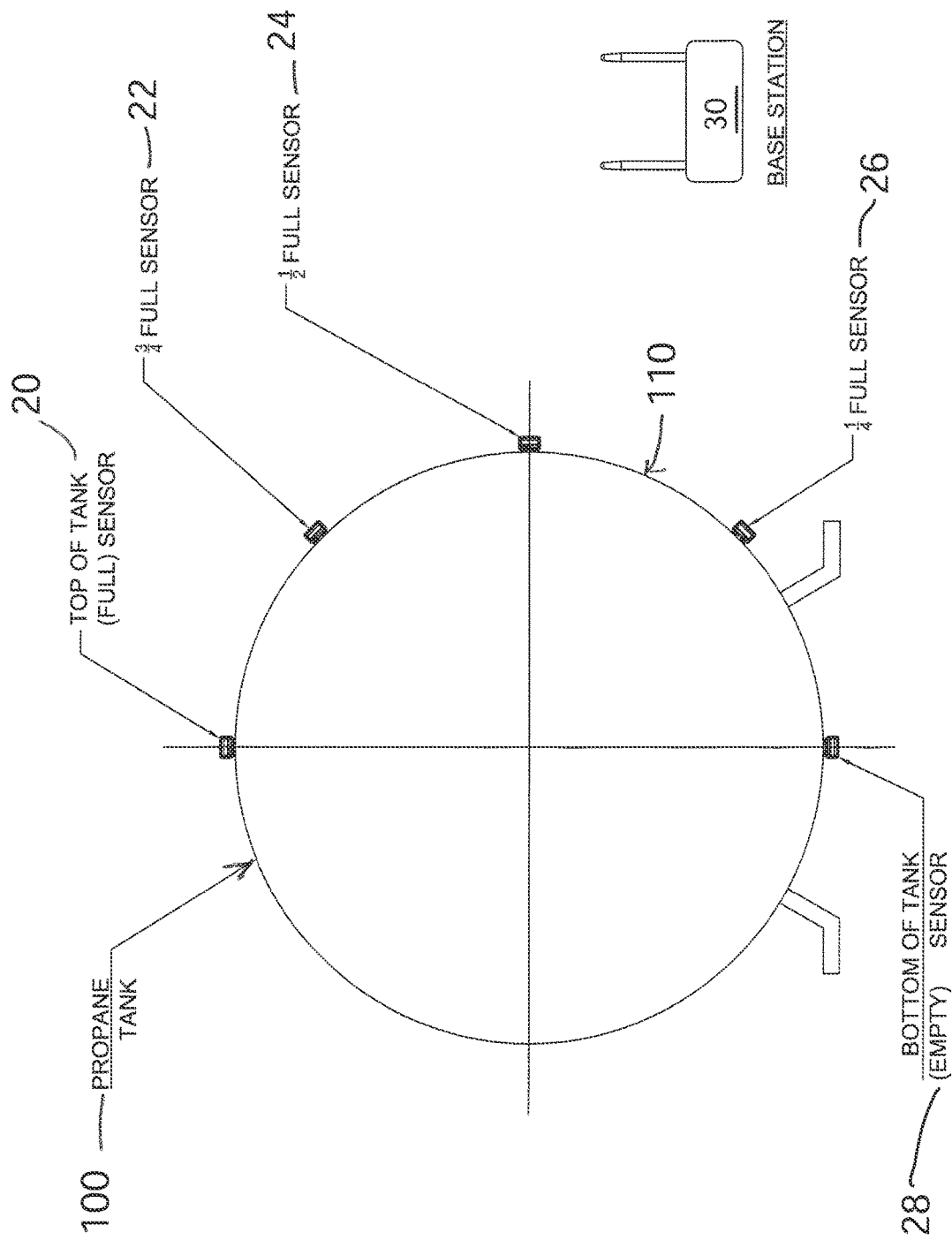
FIG. 2B is an end plan view of the storage tank of FIG. 2A having fluid level sensor units mounted thereon, as well as a base station which is part of the fluid level monitoring kit according to the first embodiment.

Referring also to FIGS. 2A-2B, a generally horizontally-oriented propane storage tank is shown generally at 100, with a primary sensor unit 20 provided for sensing a full level of the tank, is attached to an outer surface of an outside wall 110 of the tank, at or close to the top of the tank. The propane tank is used as an example, but the kit, system and methods according to the present invention may be used on any fluid storage tank which exhibits a measurable temperature change of the tank wall between fluid present next to the tank wall and fluid absent next to the tank wall.

The tank 100 includes a main tank body 102 supported by a number of support legs 104, 106. The tank 100 is well known and conventional, and does not form a part of the present invention, per se.

The primary sensor unit 20 functions by measuring the temperature of the outside wall 110 of the tank 100, where it is mounted, at a continuous predefined time interval, and compares that temperature to the ambient temperature. If the outside wall of the tank is less than the ambient temperature by a predetermined amount, then that indicates that propane, or the other liquid present in the tank, is present at that level. Each of the sensor units provides information which enables this temperature comparison to be made, and either the control unit inside of the sensor unit or the base station 30 determines if stored liquid is present at the various levels of each sensor unit.

This information is then transmitted from each sensor unit to a single base station 30. This base station 30 will then forward the information to the tank user or provider at a predetermined interval or as requested. This may be completed by email or by other communication protocol.

The other sensor units 22, 24, 26, and 28 are also shown attached to the outside wall 110 of the tank 100 at different height levels thereon, corresponding to ¾ full, ½ full, ¼ full, and empty. All of the sensor units 20, 22, 24, 26, and 28 have the structure shown in FIG. 3 and discussed above. The sensor units may be connected by a physical wire 25. Optionally, wireless communication hardware, such as Bluetooth may be used instead of the wire 25.

The invention according to the first aspect includes a control module 30, and a plurality of primary sensor units such as those shown at 20, 22, 24, 26 and 28.

The base station 30 may be a cell phone or may be a separate, standalone unit. It may be located as part of a transmitter or as a standalone unit.

The control module or base station 30 may individually communicate with each of the sensor units 20, 22, 24, 26 and 28.

Figure 5:
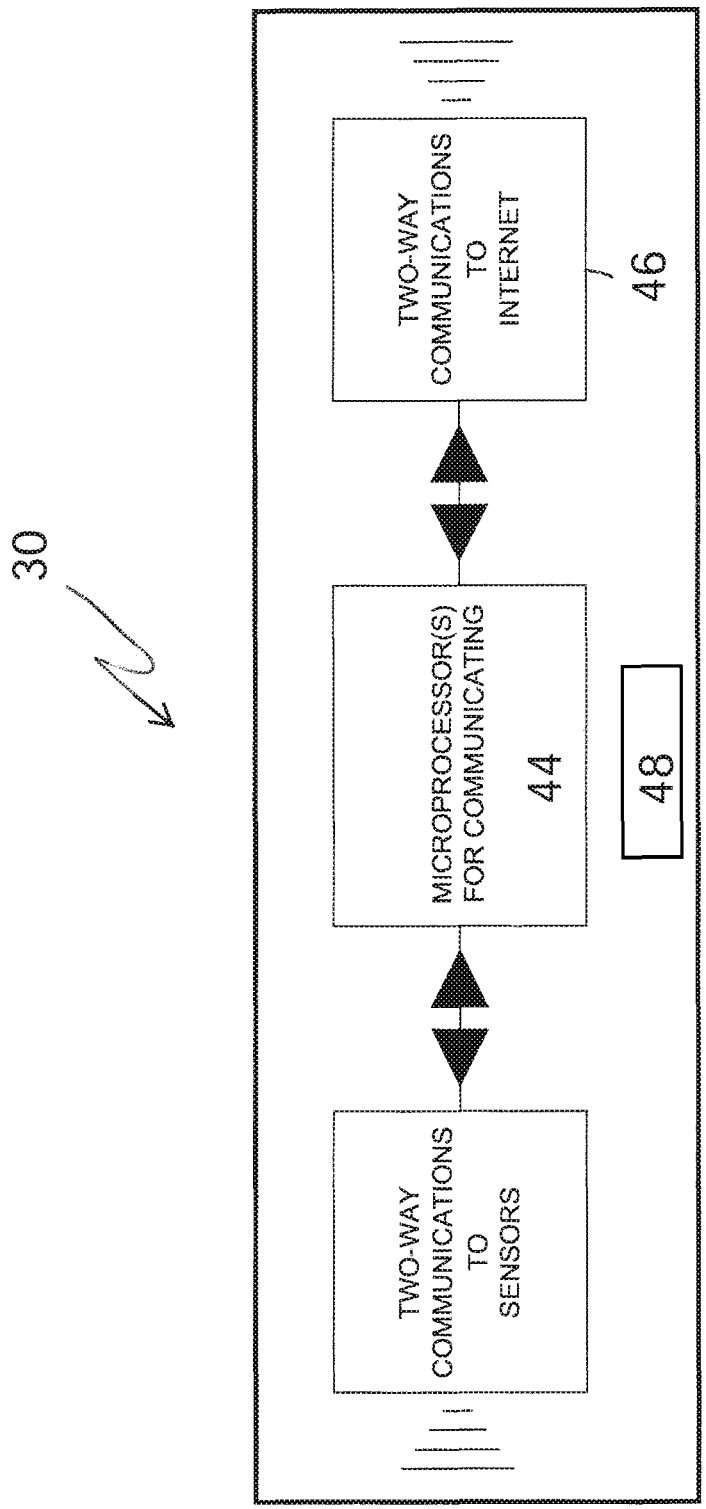
FIG. 5 is a schematic diagram of a control module or base station which is a component of the kit of FIG. 1.

The base station 30 may be located remotely from the tank 100 and the sensor units, such as at a heated indoor location relatively close to the tank. As shown in FIG. 5, the control module or base station 30 includes a circuit board having a microprocessor 44 with a memory unit thereon, and a transmitter 46 for communicating with an external communications device, such as a cell phone or an internet connection. The microprocessor 44 of the control module includes a timer, a wake-up circuit, and a program for reading all of the sensor units and recording such sensor readings along with the time and date of each reading.

The base station 30 is provided with a power source 48, which may be a battery or alternatively, which may be a plug for connecting to standard 110 volt AC power. The processor 44 of the base station 30 records readings of the sensor units 20, 22, 24, 26, and 28 at specified intervals, such as daily, weekly or a longer interval.

The base station 30 is capable of two-way communications with other supported devices (i.e. phone, tablet, laptop, workstation) using one or more appropriate protocols, in order to make programmatic changes (upgrades/patches), add/remove features, and transfer data to and from the device by utilizing custom software/firmware. The base station 30 may include one or more antennae 31 to permit radio communication.

Second Embodiment—Only Primary Sensor Unit Communicates with Base Station

Figure 6:
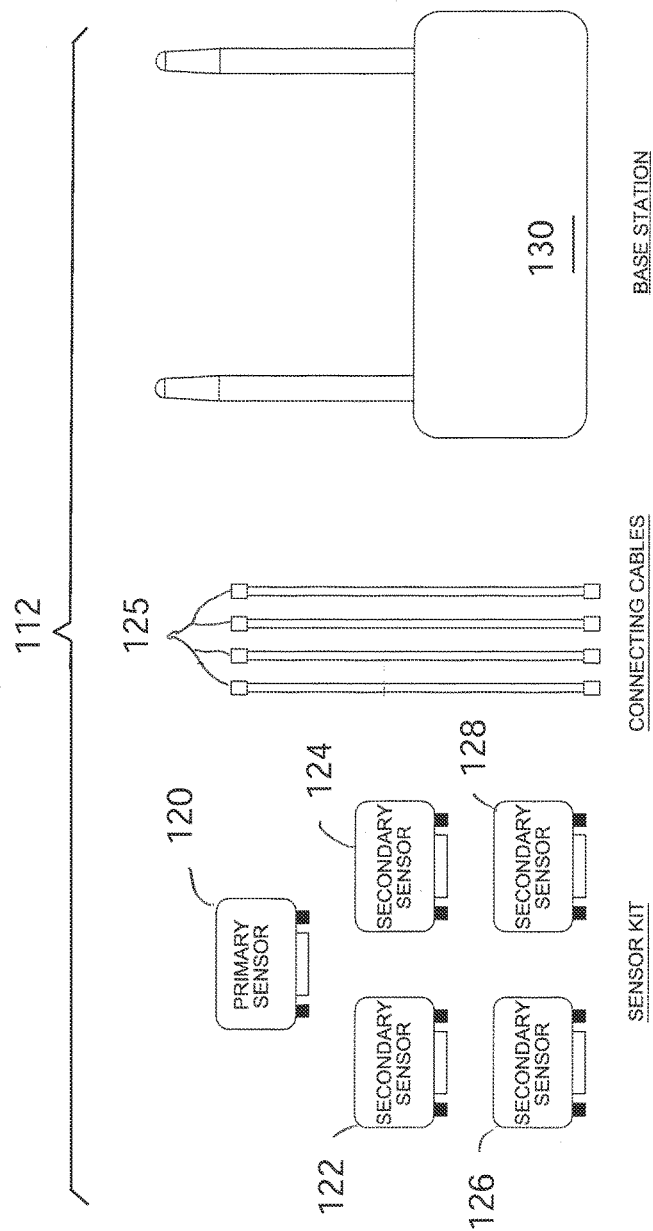
FIG. 6 is a simplified schematic diagram of a fluid level monitoring kit according to a second embodiment of the present invention.

Referring now to FIG. 6, a simplified schematic of a kit according to a second embodiment of the invention is shown generally at 112. The kit 112 is provided for use in retrofitting an existing fluid storage tank, such as that shown at 100 in FIGS. 2A-2B, to monitor and report on a fluid level in the tank 100. The tank 100 may be an existing fluid storage tank, such as a tank used for storing liquid propane, liquefied natural gas (LNG) or other fluid which is stored in a tank, to monitor a fluid level in the tank.

The kit 112 according to the present invention can be retrofitted on existing fluid storage tanks, with minimal or no modification of, or intrusion into such tanks.

As further described herein, multiple kits 112 may be used to monitor fluid levels in a plurality of individual tanks, and may be electronically coordinated to form a monitoring system according to the invention.

The kit according to the second embodiment includes a control module or base station 130, a primary sensor unit 120 and a plurality of secondary sensor units such as those shown at 122, 124, 126 and 128. All of the secondary sensor units 122, 124, 126 and 128 may be internally identical to one another, but the individual sensor units are used to measure fluid level at different heights on the tank 100, as shown in FIG. 7.

Detailed structure of the primary sensor unit 120 is the same as the structure of the sensor unit 20 shown in FIGS. 4 and 5, including the components as previously described herein.

Figure 7:
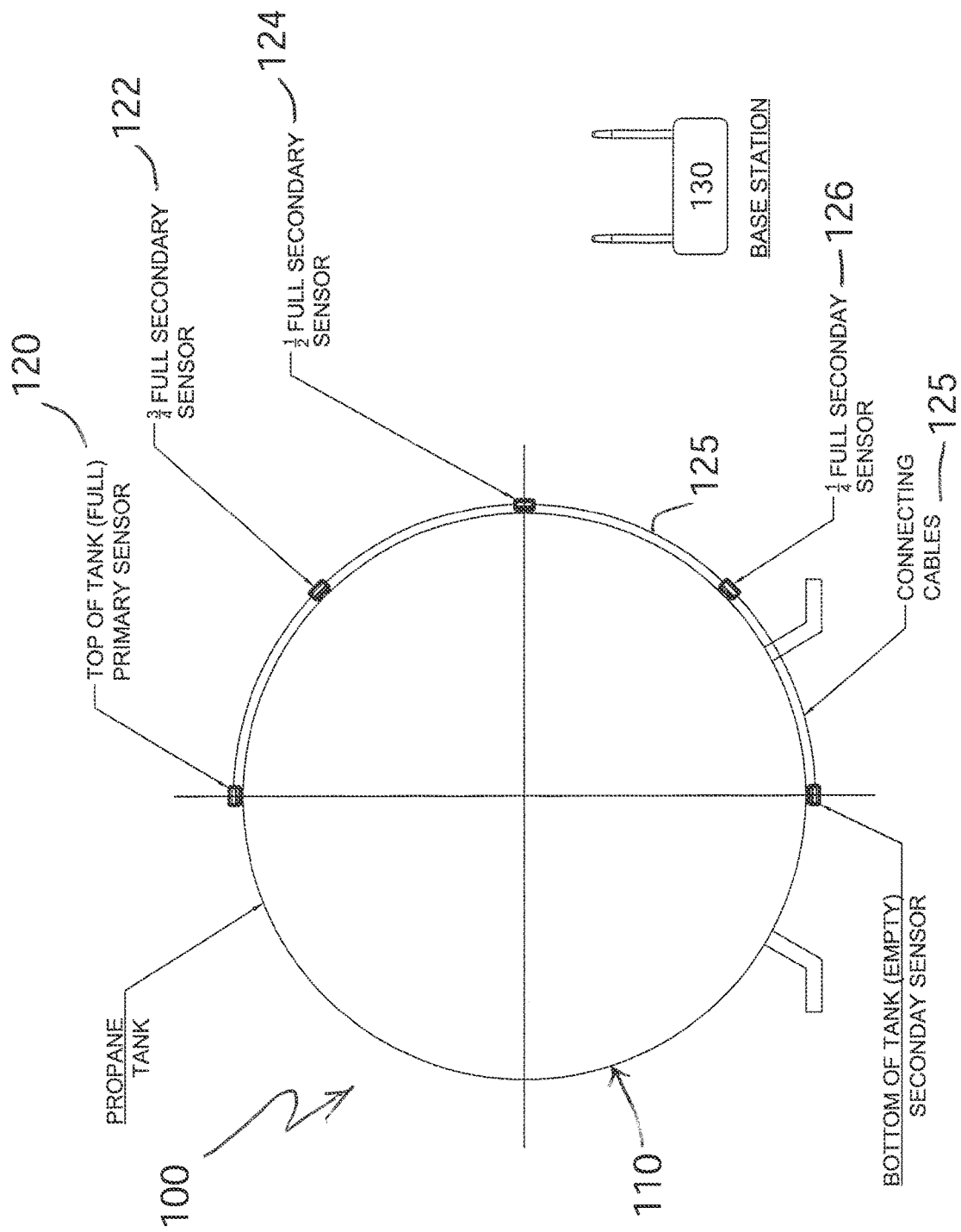
FIG. 7 is an end plan view of the storage tank of FIG. 2A having fluid level sensor units mounted thereon interconnected by connecting cables, as well as a base station which is part of the fluid level monitoring kit according to the second embodiment.

Referring also to FIG. 7, a generally horizontally-oriented propane storage tank is shown generally at 100, with a primary sensor unit 120 attached to an outer surface of an outside wall 110 of the tank, at or close to the top of the tank.

As previously noted, the tank 100 is well known and conventional, and does not form a part of the present invention, per se.

The secondary sensor units 122, 124, 126, and 128 are also shown attached to the outside wall 110 of the tank 100 at different height levels thereon, corresponding to ¾ full, ½ full, ¼ full, and empty. All of the sensor units 120, 122, 124, 126, and 128 are shown interconnected by connecting cables 125 which permit electronic communication with the primary sensor unit 120. Optionally, wireless communication hardware, such as Bluetooth may be used instead of the connecting cables 125.

The base station 130 may be a cell phone or may be a separate, standalone unit. It may be located as part of the transmitter or as a standalone unit.

The control module or base station 130 may be in electronic communication with the primary sensor unit 120, or may communicate with the sensor units 120, 122, 124, 126 and 128 via the communications link of the primary sensor unit. Where the control module 130 communicates with the primary sensor unit 120, a secondary communications link such as the connecting cables 125, which may include wiring or a fiber optic connection, is provided between the primary sensor unit 120 and the secondary sensor units 122, 124, 126 and 128.

The control module 130 is essentially the same as the control module or base station 30 previously described in connection with the first embodiment.

Each of the secondary sensor units functions by measuring the temperature of the outside wall 110 of the tank 100, where it is mounted, at a continuous predefined time interval, and compares that temperature to the ambient temperature read at the primary sensor unit 120. If the outside wall 110 of the tank 100 is less than the ambient temperature by a predetermined amount, then that indicates that propane, or the other liquid present in the tank, is present at that level. Each of the sensor units makes this temperature comparison and determines if propane, or the other liquid present in the tank, is present at the various levels of each sensor unit. This information is then transmitted from the primary sensor unit 120 to the base station 30. This base station will then forward the information to the tank user or provider at a predetermined interval or as requested. This may be completed by email or by other communication protocol.

Figure 8:
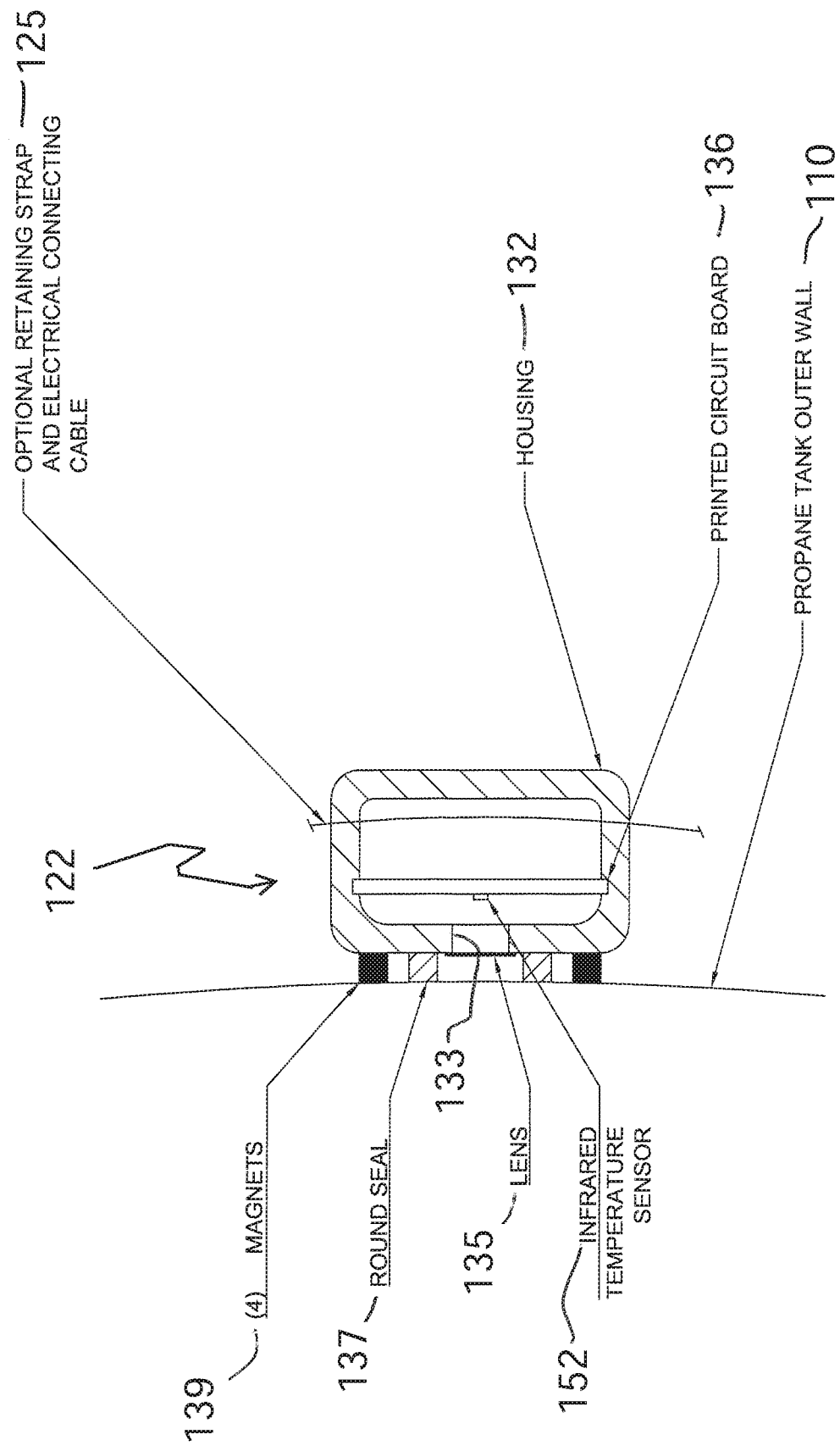
FIG. 8 is a detailed cross-sectional view of a secondary sensor unit shown mounted on a tank wall.
Figure 9:
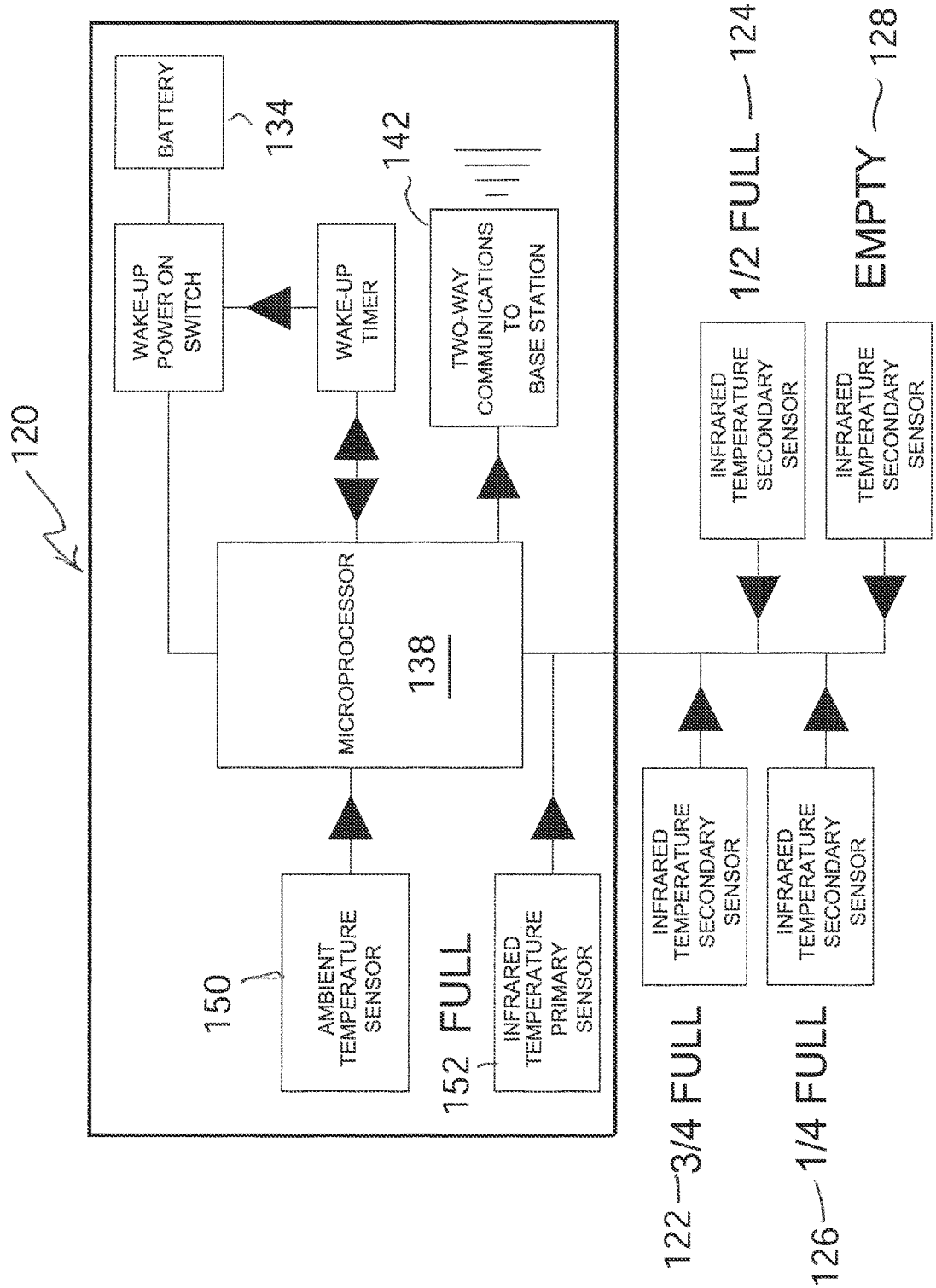
FIG. 9 is a schematic diagram showing both the primary sensor unit and the secondary sensor units according to the second embodiment hereof.
Figure 10:
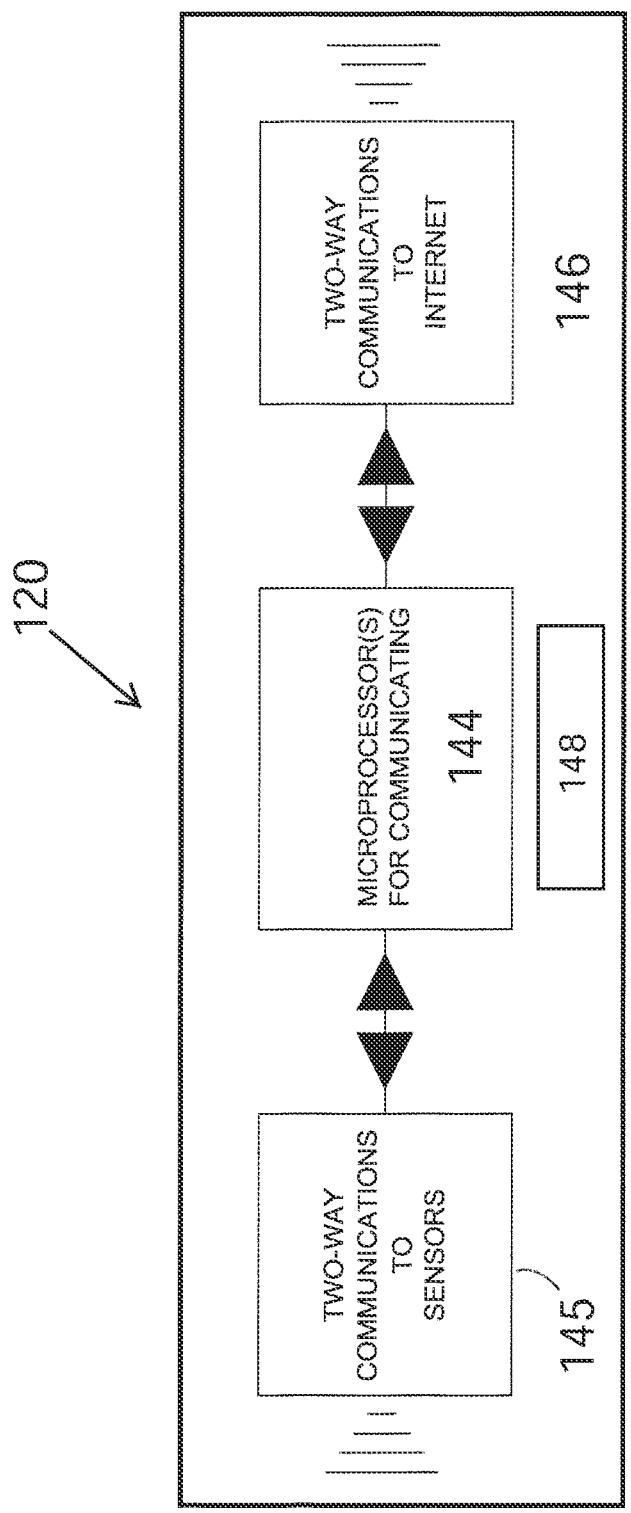
FIG. 10 is a schematic diagram of a control module or base station which is a component of the kit of FIG. 6.

As exemplified by the secondary sensor unit 122 shown in FIG. 8, each of the secondary sensor units has some features in common with the primary sensor unit 20 described in connection with the first embodiment, including a weather-resistant housing 132 having an opening 133 formed therein and having a hollow space formed therein in communication with the opening, a weather-resistant seal 137 attached to the housing 132 and surrounding the opening, attachment structure 139 for attaching the housing to a wall 110 of the tank 100, an infrared sensor 152 disposed in the housing 132 proximate the opening 133; and a communications link 125 in contact with the housing, for communicating with the primary sensor unit 120 or with the control module 130.

The base station 30 is capable of two-way communications with other supported devices (i.e. phone, tablet, laptop, workstation) using one or more appropriate protocols, in order to make programmatic changes (upgrades/patches), add/remove features, and transfer data to and from the device by utilizing custom software/firmware.

Figure 11:
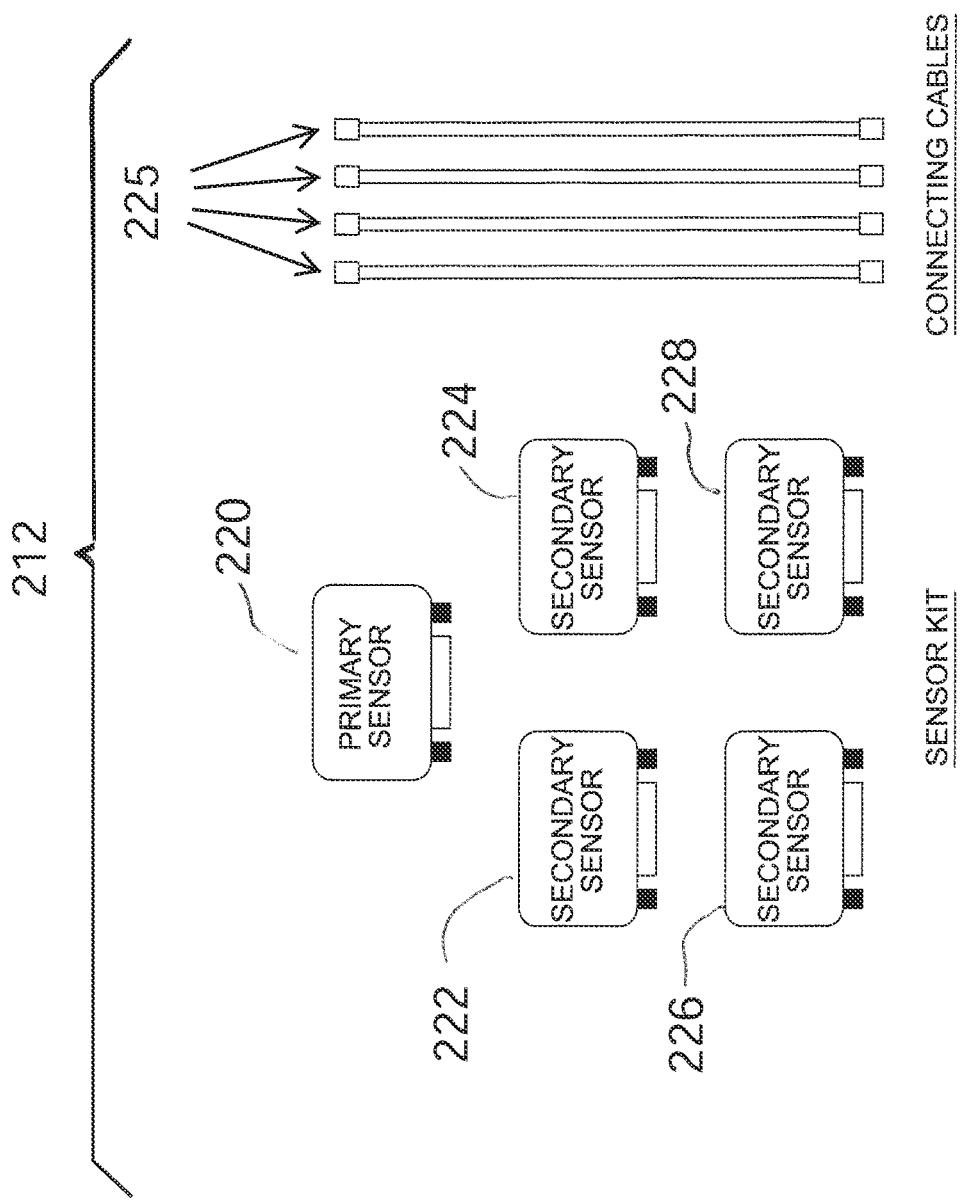
FIG. 11 is a simplified schematic diagram of a fluid level monitoring kit according to a third embodiment of the present invention, in which the primary sensor unit also acts as the base station for communicating with the internet.
Figure 12:
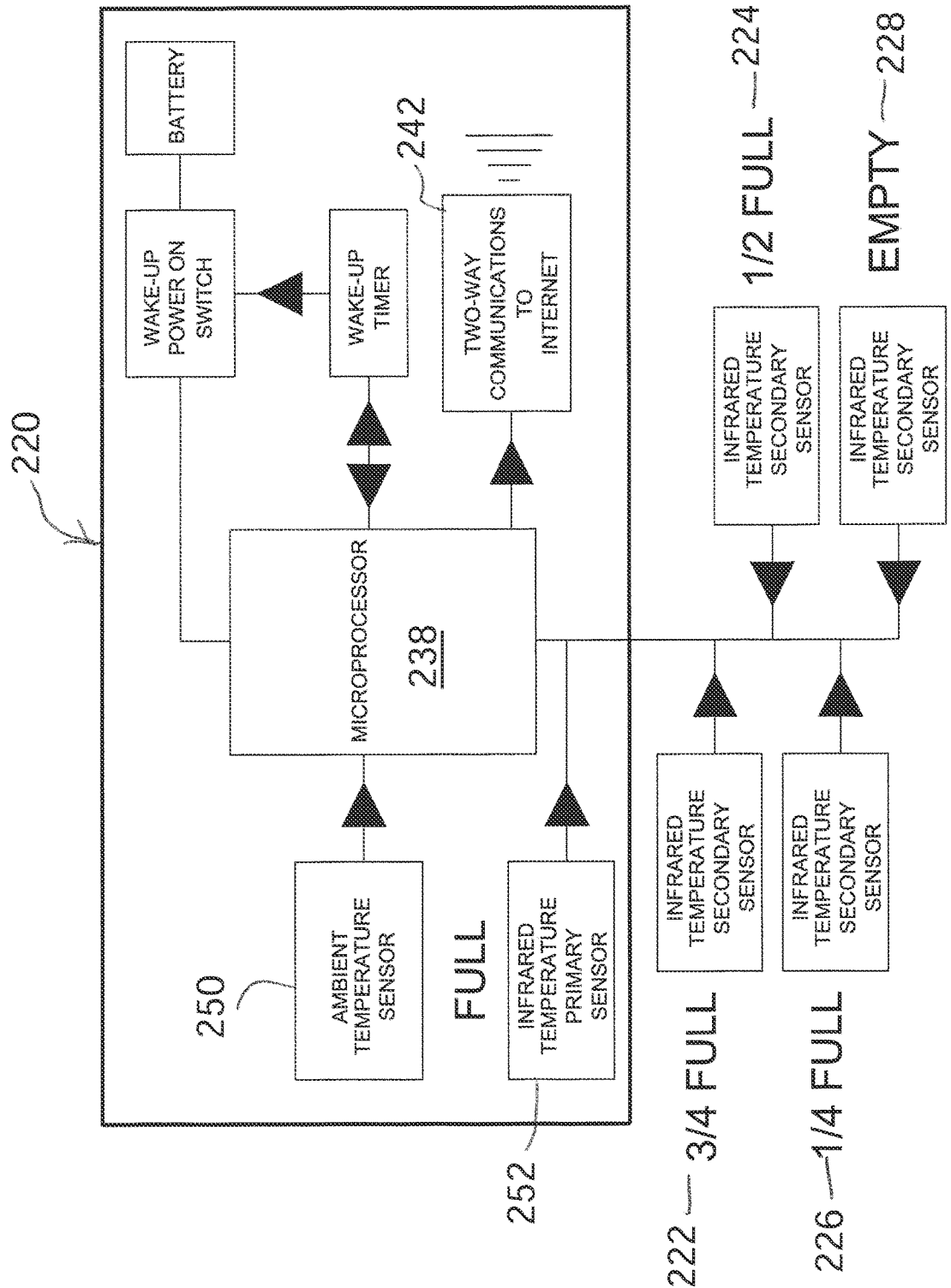
FIG. 12 is a schematic diagram showing both the primary sensor unit and the secondary sensor units according to the third embodiment hereof.

Third Embodiment—Base Station Incorporated into Single Primary Sensor Unit which Communicates Directly with Internet Referring now to FIG. 11, a simplified schematic of a kit according to a third embodiment of the invention is shown generally at 212. The kit 212 is provided for use in retro-fitting an existing fluid storage tank, such as that shown at 100 in FIGS. 2A-2B, to monitor and report on a fluid level in the tank 100. The tank 100 may be an existing fluid storage tank, such as a tank used for storing liquid propane, liquefied natural gas (LNG) or other fluid stored in a fluid storage tank, to monitor a fluid level in the tank.

The kit 212 according to the present invention can be retrofitted on existing tanks, with minimal or no modification of, or intrusion into such tanks.

As further described herein, multiple kits 212 may be used to monitor fluid levels in a plurality of individual tanks, and may be electronically coordinated to form a monitoring system according to the invention.

The kit 212 includes a plurality of sensor units, such as those shown at 220, 222, 224, 226 and 228, as well with a control module or base station incorporated inside of the primary sensor unit 220. The sensor units include a primary sensor unit 220 and a plurality of secondary sensor units 222, 224, 226, and 228. All of the secondary sensor units 222, 224, 226 and 228 may be identical to one another.

Detailed structure of the primary sensor unit 20 begins with structure similar to that shown in FIGS. 4 and 5, with the additional feature that in this third embodiment, the base station has now been incorporated into the internal structure of the primary sensor unit 220.

The secondary sensor units 222, 24, 226, and 228 are also attached to the outside wall 110 of the tank 100 at different height levels thereon, corresponding to ¾ full, ½ full, ¼ full, and empty. All of the sensor units 220, 222, 224, 226, and 228 are shown interconnected by communication connectors 225. Optionally, wireless communication hardware, such as Bluetooth may be used instead of the connectors 225.

The primary sensor unit 220 includes a circuit board having a microprocessor 238 and a memory unit thereon, and a transmitter 242 for communicating with an external communications device, such as a cell phone or an internet connection. The microprocessor 238 of the primary sensor unit 220 includes a timer, a wake-up circuit, and a program for reading all of the sensor units and recording such sensor readings along with the time and date of each reading.

The microprocessor 238 is designed to remain off whenever the tool is not in use to extend the useful life of the battery, allowing the apparatus to use a relatively small battery. The processor records readings of the sensor units 220, 222, 224, 226, and 228 at specified intervals, such as daily, weekly or a longer interval.

The circuit board of the primary sensor unit 220 includes a switch for starting and stopping the timer as preselected. The switch may be a step programmed into the microprocessor 238.

The transmitter 242 is provided for sending data from the microprocessor to a data collection device, such as a server, local computer or smartphone app, which may be remotely located from the apparatus 220. The communication device(s) may include one or more devices selected from Bluetooth, Wi-Fi, Radio Frequency (RF), Infrared sending and/or receiving unit, ANT+ Device, USB, serial, parallel, and FireWire© wired interface.

The transmitting unit functions by measuring the temperature of the outside wall of the propane tank, where it is mounted, at a continuous predefined time interval, and compares that temperature to the ambient temperature. If the outside wall of the tank is less than the ambient temperature by a predetermined amount, then that would indicate that propane is present at that level. Each of the transmitters makes this temperature comparison and determines if propane, or other fluid stored in the tank, is present at the various levels of each sensor unit. This information is then transmitted from the transmitter 242 to the user or manager at a predetermined interval or as requested. This may be completed by email or by other communication protocol.

Each of the secondary sensor units has some features in common with the primary sensor unit, including a weather-resistant housing having an opening formed therein and having a hollow space formed therein in communication with the opening a weather-resistant seal attached to the housing and surrounding the opening, attachment structure for attaching the housing to a wall of the tank, an infrared sensor disposed in the housing proximate the opening; and a communications link in the housing for communicating with the primary sensor unit or with the control module.

The primary sensor unit 220 is capable of two-way communications with other supported devices (i.e. phone, tablet, laptop, workstation) using one or more appropriate protocols, in order to make programmatic changes (upgrades/patches), add/remove features, and transfer data to and from the device by utilizing custom software/firmware.

System for Monitoring Multiple Fluid Tank Levels

A system for monitoring fluid levels in multiple fluid storage tanks according to the present invention could be provided where each tank in the system is provided with a fluid level monitoring apparatus, such as the kit 10 described herein.

The system includes a main control processor which intermittently receives input data from each of the base stations for the tanks included in the system, including data representing the physical location of each tank. The main control processor includes a non-volatile memory which stores and reports on data regarding fluid levels in each of the tanks.

The main control processor could be programmed to print a daily or weekly report showing fluid levels for each of the tanks in the system. In addition, the main control processor could be programmed to issue a warning to appropriate management personnel, at specified intervals, that specific tanks are in need of refilling if the sensor units indicate such conditions. Optionally, the system may be programmed to schedule and order refills of individual tanks when the levels of those tanks are reported as being low.

Method of Using the Kit

The present invention also relates to a method of monitoring fluid levels over time in a fluid storage tank, using the equipment from one of the kits according to the invention.

The method includes a first step of mounting sensor units at different levels on a tank wall using sensor units from the kit as previously described herein.

The method also includes a second step of activating the base station to enable sensor readouts from each sensor unit. Such activation may include calibrating the base station to register each of the sensor units with its assigned tank fluid level.

The method also includes a subsequent step of connecting the base station to the internet or to a cell phone, so that the sensed fluid level in the tank can be remotely monitored and observed.

Optionally, the method may include a step of sending an alert message to a user when a tank is at a low level, and may further include a step of robotically ordering a refill of a low tank.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

Having, thus, described the invention, what is claimed is:

1. A fluid level monitoring kit for connecting to a fluid storage tank to monitor a fluid level in the tank, said kit comprising:
    a control module including a circuit board having a microprocessor and a memory unit thereon, a timer, a wake-up circuit and a transmitter for communicating with an external communications device;
    a primary sensor unit configured to detect a temperature of an exterior area of a wall of the tank proximate the primary sensor unit when installed thereon, said primary sensor unit comprising:
        a first housing which is a weather-resistant housing having an opening formed therein and having a hollow space formed therein in communication with the opening;
        a first weather-resistant seal attached to the first housing and surrounding the opening;
        attachment structure for attaching the first housing to the wall of the fluid storage tank; a first circuit board disposed within the first housing;
        a first infrared temperature sensor disposed in the housing proximate the opening thereof;
        a first ambient temperature sensor disposed in the first housing, the first ambient temperature separate from the first infrared temperature sensor; and
        a first communications link in the first housing for communicating with the control module; and
    a plurality of secondary sensor units configured to detect a temperature of a respective area of an exterior wall of the tank proximate the secondary sensor unit when installed thereon, each secondary sensor unit comprising:
        a second housing which is a weather-resistant housing having an opening formed therein and having a hollow space formed therein in communication with the opening thereof;
        a second weather-resistant seal attached to the second housing and surrounding the opening thereof;
        attachment structure for attaching the second housing to the wall of the fluid storage tank;
        a second circuit board disposed within the second housing;
        a second infrared temperature sensor disposed in the second housing proximate the opening thereof; and
        a second communications link in the second housing for communicating with the primary sensor unit or with the control module,
    wherein the control module is configured so that, when the senor units are installed on the tank, the control module is operable to compare temperatures of each of the respective areas of the tank wall proximate said sensor units to an ambient temperature sensed by the ambient temperature sensor, and thereby to determine the fluid level in the tank.

2. The fluid level monitoring kit of claim 1, wherein each of the secondary sensor units is identical to the primary sensor unit.

3. The fluid level monitoring kit of claim 1, wherein the control module is configured to communicate remotely with the primary sensor unit.

4. The fluid level monitoring kit of claim 1, wherein the control module is situated inside the first housing as a component of the primary sensor unit.

5. A fluid level monitoring kit for connecting to a fluid storage tank to monitor a fluid level in the tank, said fluid level monitoring kit comprising:
    a control module including a circuit board having a microprocessor and a memory unit thereon, a timer, a wake-up circuit and a transmitter for communicating with an external communications device;
    a plurality of primary sensor units configured to detect a temperature of a respective exterior area of a wall of the tank proximate the primary sensor unit when installed thereon, each of said primary sensor units comprising:
        a weather-resistant housing having an opening formed therein and having a hollow space formed therein in communication with the opening;
        a weather-resistant seal attached to the housing and surrounding the opening;
    attachment structure for attaching the housing to an exterior wall of the tank;
        a circuit board disposed within the housing; an infrared temperature sensor disposed in the housing proximate the opening;
        an ambient temperature sensor disposed in the housing; and
    a communications link in the housing for communicating with the control module,
        wherein, when the senor units are installed on the tank, the control module is configured to compare temperatures of each of the respective areas of the tank wall proximate said sensor units to the ambient temperature, and thereby to determine the fluid level in the tank.

6. The fluid level monitoring kit of claim 5, wherein the control module is configured to communicate remotely with each of the primary sensor units.

7. The fluid level monitoring kit of claim 5, wherein the control module is situated inside the housing as a component of one of the primary sensor units.

8. A system for monitoring fluid levels in a plurality of fluid storage tanks, the system comprising a plurality of fluid level monitoring kits, each of the fluid storage tanks having one of said fluid level monitoring kits installed thereon, and a program for receiving and storing information concerning respective fluid levels in each of the fluid storage tanks, wherein each of the fluid level monitoring kits comprises:
 a control module including a circuit board having a microprocessor and a memory unit thereon, a timer, a wake-up circuit and a transmitter for communicating with an external communications device;
 a primary sensor unit configured to detect a temperature of an exterior area of a wall of the tank proximate the primary sensor unit, said primary sensor unit comprising:
  a first housing which is a weather-resistant housing having an opening formed therein and having a hollow space formed therein in communication with the opening;
  a first weather-resistant seal attached to the first housing and surrounding the opening;
  attachment structure for attaching the first housing to a wall of the fluid storage tank;
  a first circuit board disposed within the first housing;
  a first infrared temperature sensor disposed in the housing proximate the opening thereof;
  a first ambient temperature sensor disposed in the first housing; and
  a first communications link in the first housing for communicating with the control module; and
 a plurality of secondary sensor units configured to detect a temperature of a respective area of the exterior tank wall proximate the secondary sensor unit, each of said secondary sensor units comprising:
  a second housing which is a weather-resistant housing having an opening formed therein and having a hollow space formed therein in communication with the opening thereof;
  a second weather-resistant seal attached to the second housing and surrounding the opening thereof;
  attachment structure for attaching the second housing to a wall of the fluid storage tank;
  a second circuit board disposed within the second housing; a second infrared temperature sensor disposed in the second housing proximate the opening thereof; and
  a second communications link in the second housing for communicating with the primary sensor unit or with the control module,
 wherein the program is configured to compare temperatures of each of the respective areas of the tank wall proximate said sensor units to the ambient temperature for each of said tanks, and thereby to determine the fluid level in each of the respective tanks.

9. The system of claim 8, wherein the program is operable to send a low level alert to a user when a level in any one of the tanks drops below a predetermined level.

10. The system of claim 8, wherein the program is operable to automatically reorder fluid when a level in anyone of the tanks drops below a predetermined level.

11. A method of monitoring fluid levels overtime in a fluid storage tank, comprising:
 providing a fluid storage tank having a tank wall and equipped with a fluid level monitoring kit, wherein the fluid level monitoring kit comprising:
  a control module including a circuit board having a microprocessor and a memory unit thereon, a timer, a wake-up circuit and a transmitter for communicating with an external communications device;
  a primary sensor unit configured to detect a temperature of an exterior area of a wall of the tank proximate the primary sensor unit when installed thereon, said primary sensor unit comprising:
   a first housing which is a weather-resistant housing having an opening formed therein and having a hollow space formed therein in communication with the opening;
   a first weather-resistant seal attached to the first housing and surrounding the opening;
   attachment structure for attaching the first housing to the wall of the fluid storage tank; a first circuit board disposed within the first housing;
   a first infrared temperature sensor disposed in the housing proximate the opening thereof;
   a first ambient temperature sensor disposed in the first housing, the first ambient temperature separate from the first infrared temperature sensor; and
   a first communications link in the first housing for communicating with the control module; and
  a plurality of secondary sensor units configured to detect a temperature of a respective area of an exterior wall of the tank proximate the secondary sensor unit when installed thereon, each secondary sensor unit comprising:
   a second housing which is a weather-resistant housing having an opening formed therein and having a hollow space formed therein in communication with the opening thereof;
   a second weather-resistant seal attached to the second housing and surrounding the opening thereof;
   attachment structure for attaching the second housing to the wall of the fluid storage tank;
   a second circuit board disposed within the second housing;
   a second infrared temperature sensor disposed in the second housing proximate the opening thereof; and
   a second communications link in the second housing for communicating with the primary sensor unit or with the control module;
 the method further comprising the steps of:
 mounting the primary and secondary sensor units at different height levels on an external wall of the tank;
 activating a base station in electronic communication with the sensor units to enable readouts from each sensor unit;
 connecting the base station to a remote communications device, so that the sensed fluid level in the tank can be remotely monitored and observed;
 comparing each of a plurality of temperatures determined by the respective infrared temperature sensors to an ambient temperature sensed by the first ambient temperature sensor, and
 determining a temperature difference for each sensor unit; and determining a level of fluid in said tank, based on the differences.

12. The method of claim 11, further comprising a step of sending an alert message to a user when a fluid level in the tank drops below a predetermined level.

13. The method of claim 11, further comprising a step of automatically ordering a refill when a fluid level in the tank drops below a predetermined level.

\* \* \* \* \*